Feb. 19, 1935.  E. STERN  1,991,472
METHOD AND APPARATUS FOR PRODUCING AND PROJECTING SOUND MOTION PICTURES
Original Filed Jan. 12, 1929
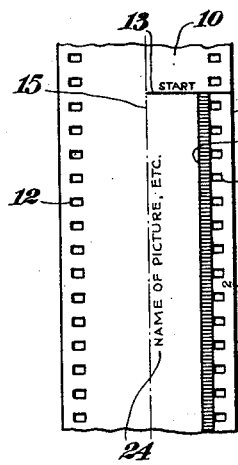
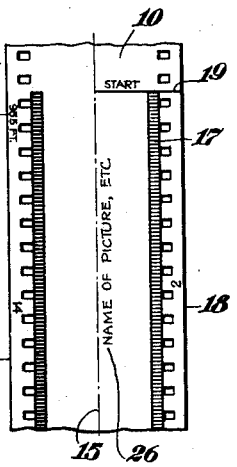
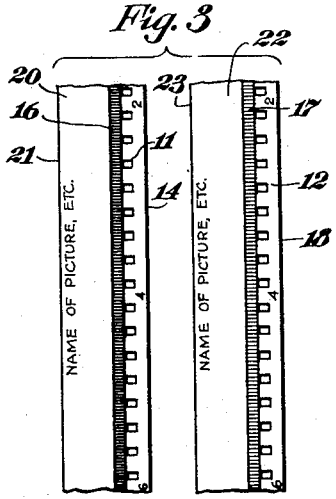
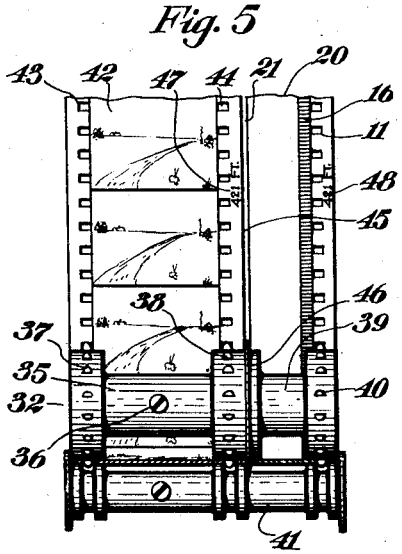
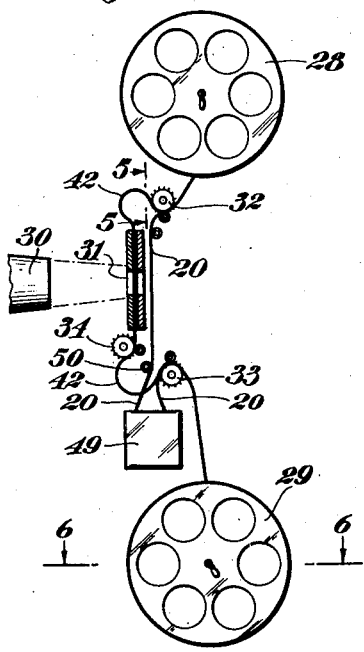
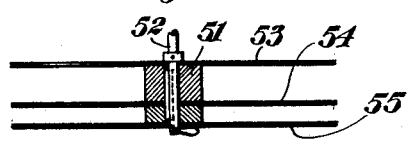
INVENTOR
Ernest Stern,
BY
Frederick Breitenfeld
ATTORNEY Patented Feb. 19, 1935

1,991,472

UNITED STATES PATENT OFFICE 1,991,472

METHOD AND APPARATUS FOR PRODUCING AND PROJECTING SOUND-MOTION PICTURES

Ernest Stern, Astoria, N. Y.

Application January 12, 1929, Serial No. 332,052
Renewed July 12, 1934

4 Claims. (Cl. 88—16.2)

My present invention relates generally to sound-motion pictures, and has particular reference to an improved method and apparatus for producing and projecting such pictures.

In the methods heretofore customarily employed for recording, printing, developing, and ultimately projecting a series of pictures in synchronism with certain sound, the recordation has been effected upon either one film or upon two independent films. In either event, it has been customary thereafter to produce a single positive film whereon a series of pictures and a series of sound records are arranged side by side. Such a system has been subject to a number of disadvantages which will be illustratively pointed out for the purpose of laying a foundation for the full understanding and appreciation of my present invention.

In the first place, the light for producing the pictures is not the same light which produces the sound records, and the printing of such picture and sound records on a single positive film therefore necessitates two procedures, generally referred to as "double printing". In other words, the pictures are printed during one procedure, and in accordance with the light density required, and the sound records are thereupon printed during a second procedure, in accordance with the particular light density required for them.

Apart from the necessity for such double printing, the subsequent developing of the duplex positive film presents a similar difficulty. The pictures may require a strength of developing solution and time of development different from that required by the sound records. Since the developing cannot feasibly be accomplished in two procedures, as may be done with the printing, it generally resolves itself into a compromise whereby both the pictures and the sound records are developed to the best possible degree. In certain cases, where it is important to produce highly efficient sound records, the developing is directed toward this end and the efficiency of the development with respect to the pictures is accordingly sacrificed, or vice versa.

In the third place, a single film bearing both pictures and sound records is of necessity inefficient and uneconomical because a possible defect of either one or the other record will necessitate complete replacement of both.

Furthermore, the passage of such a film through a projecting apparatus subjects both the pictures and the sound records to an intermittent motion which is necessary for the proper projecting of the pictures, but is unnecessary from the standpoint of the sound records. This subjection of the sound records to an intermittent advance is necessarily accomplished even though, as is the custom, the sound records are not reproduced until the film has passed through the intermittent stage and into a special apparatus wherein a continuous movement of the film enables a reproduction of the sound to be effected. It need hardly be pointed out that the intermittent engagement and advancement of the film subjects the latter to much wear and tear which is particularly disastrous with respect to the very delicate recordations of sound.

Apart from the foregoing disadvantages, it is obvious that the size of each picture must be somewhat reduced in order to provide space upon a standard film for the sound record. This reduction in size gives rise to a further annoyance in that the aperture plate of a standard motion picture projecting apparatus must be correspondingly reduced each time a film of the foregoing character is passed through said apparatus.

Incidentally, a film of the foregoing character can be employed only with a particular type of projecting apparatus wherein the sound-reproducing portion or box is carefully located in a predetermined relationship to the aperture plate. The sound record which parallels the series of pictures is longitudinally offset with respect to the pictures and the amount of this offsetting is fixed and unalterable once the film has been completed.

It is a general object of my present invention to provide a method of producing and projecting sound pictures wherein the foregoing disadvantages have been obviated and wherein the importance of maintaining standards and employing standard apparatus has been carefully borne in mind and has been departed from in only one or two minor instances.

Briefly, my invention has recourse to the employment of two positive films, one of which bears the picture record, and the other of which bears the sound record. This permits of efficient printing and developing for each thereof and enables the picture film to employ the maximum width for recordation of the pictures. Thus, the picture film is identical with the picture film heretofore in wide use for many years, and may, in fact, be passed through standard projecting machines whether the same are equipped for reproduction of sound or not.

I am aware that the employment of two films has heretofore been resorted to for similar purposes, but I will point out that the projection of such films has been accomplished by means of two separate projecting machines. Apart from the cumbersome nature of such an arrangement and the necessity for additional attendance, this method is obviously unsatisfactory from a purely cost standpoint, since an extra projecting apparatus is extremely expensive.

My present invention, while employing two films, is of such a nature that a single standard projecting apparatus may be satisfactorily employed. My invention requires no rebuilding or remodeling of the apparatus beyond a replacement of one or two simple elements. Furthermore, my invention takes full cognizance of the desirability of employing standard film throughout and of continuing to the maximum possible degree the customary employment of standard printing and developing apparatus and the methods incidental thereto.

With the foregoing illustrative disadvantages in mind, as well as advantages and features of production and projection which are to be attained, and with a full realization of the structural natures of standard projecting machines and the limited amount of space therein, I have devised a method and apparatus for producing and projecting sound-motion pictures by means of two separately printed and developed and independent films, and for the purpose of more clearly explaining the nature of my invention, I have illustrated the same in the accompanying drawing, wherein—

Figure 1 is a fragmentary view of a standard size positive film during the initial treatment thereof to place a sound record thereon;

Figure 2 is a view similar to Figure 1, showing a different portion of the same film during the production of a second sound record thereon;

Figure 3 is a fragmentary view of the same film after it has been severed to produce independent films;

Figure 4 is a diagrammatic representation of a standard projecting machine showing its manner of operation in accordance with my present invention;

Figure 5 is an enlarged view taken substantially along the direction 5—5 of Figure 4, showing one phase of my invention; and Figure 6 is a fragmentary cross-sectional view taken substantially along the line 6—6 of Figure 4.

Having received from the producer either one or two negative films upon which picture records and sound records have been recorded by the usual methods of photography and the like, my invention first involves the production of a positive film of standard size bearing nothing but the picture record. Such film has not been illustrated since it is by itself wellknown. It is provided with perforations along its opposite edges and carries a series of pictures in successive frames, each of which has a width as large as the film will accommodate. This picture positive film is independently printed and developed in accordance with standard practice and such treatment may be regulated at will to fulfill all the requirements of the particular photography which is involved.

I then employ a second standard size positive film 10 and print upon the same the sound records or sound track which correspond to the pictures of the first-mentioned film. This may be accomplished in accordance with standard methods, whether the negative of these sound records submitted by the producer is on a separate film or upon the same negative film which carries the pictures.

Referring particularly to Figure 1, I will stress the standard nature of the film 10 by pointing out that it has the usual perforations 11 along one edge and the perforations 12 along the opposite edge. The sound record which I produce is commenced at a selected point which may be indicated on the film by a transverse line 13. This transverse line does not extend across the entire width of the film 10, however, but extends only from one edge 14 thereof to a medial longitudinal line 15. It is understood that the line 15 is not an actual line upon the film but is merely one which I have employed in the accompanying drawing to facilitate the explanation of my invention.

The sound track 16 is printed downwardly along the right-hand side of the film 10, as the same is viewed in Figure 1, and comprises a track or band of approximately the width shown. This width is not of importance so long as the band 16 lies in its entirety within the half of the film lying between the edge 14 and the medial line 15.

It is obvious that this sound track may be printed under such desired regulation as will most efficiently conform to the requirements of the negative submitted.

After this sound record has been printed, the film is reversed as shown in Figure 2 and a second sound record 17 is printed in the longitudinal film half lying between the medial line 15 and the edge 18 opposite to the edge 14. This second sound track 17 is made to commence in a similar manner at a suitably selected starting point which may be indicated by a line 19, and it is to be noted that the line 19, like the previously mentioned line 13, extends only halfway across the film, viz., from the edge 18 to the medial line 15.

The sound track 17 will bear the sound records which correspond to the pictures upon a third full-sized standard positive film which has been produced in the same manner as the first picture film mentioned above.

The film 10 is then developed in the usual manner and in accordance with standard procedure and it is similarly subjected to the usual treatments of drying, processing, etc. After the treatment is completed, the film is run through a cutter which severs the same substantially along the medial line 15 previously referred to.

As a result, where the film is severed along such medial line, the two independent films illustrated in Figure 3 are produced. The film 20 carries the sound track 16, the perforations 11, and the longitudinal edge 14. Its opposite longitudinal edge may now be referred to by the reference numeral 21. The other film 22 carries the sound track 17, the perforations 12, the longitudinal edge 18, and its opposite longitudinal edge may now be referred to by the reference numeral 23. Each of the films 20 and 22 is thus of a width less than that of a standard film, and in the illustrated embodiment, of exactly half the width of such standard film. Furthermore, each of the films 20 and 22 has only one set of perforations which are arranged adjacent to one longitudinal edge thereof.

During the production of the films 20 and 22, and preferably after the printing but before the developing thereof, I provide suitable markings upon the film 10, not only to identify the particular sound records but also to parallel the same with successive indications which correspond to the frames on the positive picture film to which such sound records correspond. In other words, referring to Figure 1, during the production of the sound track 16 I imprint, as at 24, the name of the picture, the name of the producer, and similar desirable information. This information may advantageously be reprinted at intervals throughout the length of the film. At the same time, I provide suitable indications along the margin adjacent to the edge 14, which indications are preferably numbers which are placed at successive distances of one foot along the film. Since there are usually sixteen frames for each foot of film, the lengths between the markings which represent feet are preferably marked to indicate frames. For example, the mark "2" shown at 25 in Figure 1 indicates that from the line 13 to the mark 25 a distance exists equal to two frames of the corresponding picture film.

During the production of the sound record 17 (see Figure 2) I similarly mark as at 26 to indicate the name of the picture, and the like. In this figure, one of the markings previously referred to is shown adjacent to the edge 14. Thus, the indication at 27 represents that this point is nine hundred fifty-five (955) feet from the starting line 13.

In Figure 4 I have illustrated a typical motion picture projecting apparatus wherein a reel or reels 28 is mounted in a so-called "feed magazine" and carries the film which is to be fed through the apparatus. A similar reel or reels 29 is mounted in a corresponding "take-up magazine". I have diagrammatically shown a source of light 30, an aperture plate 31, a feeding sprocket 32, a take-up sprocket 33, and an intermittently operated device or sprocket 34. Where a single film is employed, bearing no sound records, it has customarily followed a path which leads it from the feeding reel into engagement with and around the feeding sprocket, thence past the aperture plate, thence into engagement and past the intermittent device, thence into engagement with and around the take-up sprocket, and ultimately into the take-up magazine. In accordance with my present invention, a standard type of apparatus of the character mentioned is capable of employment by providing the sprockets 32 and 33 in the form illustrated most clearly in Figure 5.

Referring to Figure 5, I will point out that the sprocket comprises a sleeve portion 35 adapted to be mounted upon a suitable driving shaft as by means of a set screw 36. Two sets of teeth 37 and 38 are provided at suitable spaced intervals to engage with the two sets of perforations upon a standard size film. In accordance with my invention, the sleeve portion 35 is extended beyond the teeth 38 to form a slight extension 39, and a third set of teeth 40 is provided in a spaced relationship substantially as illustrated. A suitable guiding roller 41 may be associated with each sprocket.

In Figure 5 I have shown a positive picture film 42 of the character previously referred to and provided with the opposite sets of perforations 43 and 44. Alongside of this film I have shown a sound film of the character illustrated in Figure 3, and for the present purposes I will assume this film to be the film 20 which bears the sound record 16 and is provided with the set of perforations 11.

The films 42 and 20 are fed from a pair of axially aligned feeding reels mounted in a suitable feed magazine such as that which would accommodate the reel or reels 28. The film 42 is brought around the sprocket 32 and thence beneath the same, as shown in Figures 4 and 5. The teeth 37 and 38 engage respectively with the perforations 43 and 44 to feed this film from its feed reel into the apparatus. The film 20 is brought down from its corresponding feed reel alongside of the film 42 with the unperforated edge 21 adjacent to the edge 45 of the film 42. In this way, the teeth 40 engage with the perforations 11 in the manner illustrated. Preferably, a flange 46 is provided upon the sprocket 32 to facilitate the close side by side guidance of the two films 42 and 20.

The picture film 42 is suitably provided with markings such as those shown at 47 which also indicate feet and frames, and to feed the films in synchronism, they are threaded around the sprocket 32 with corresponding markings in alignment. Thus, the marking 47 is seen to be in alignment with the marking 48.

The two corresponding films being thus simultaneously engaged by the feeding sprocket 32, it is thereby assured that they will be fed from the feeding reels and into the apparatus at identical speeds. After leaving the sprocket 32, however, they are caused to travel different paths. In Figure 4 it will be noted that the film 42 has been made to pass the aperture plate 31 into engagement with the intermittent device 34 and thence into engagement with the take-up sprocket 33. The device 34 operates upon the film 42 to advance the same intermittently in a well-known manner to properly project the pictures thereon. The film 20 is independently guided, however, and is advanced non-intermittently through the apparatus, being kept clear of the intermittent device 34 and being suitably guided by means of rollers, sleeves, tubes, or the like, which I have not illustrated.

At 49 I have illustrated diagrammatically an apparatus wherein the sound records are reproduced. The film 20 is guided into this apparatus as by means of a roller or the like 50, and upon leaving this apparatus this film comes into engagement with the take-up sprocket 33. It would also be satisfactory, if desired, to have the film 20 pass through the apparatus 49 after engagement with the take-up sprocket 33.

The latter sprocket is constructed similarly to the sprocket illustrated in Figure 5 and operates simultaneously to reengage both films 20 and 42, thereupon delivering these films side by side to the take-up reels.

In Figure 6 I have illustrated a type of composite reel which may be employed with my apparatus and in the carrying out of my method of projection. A hub 51 is provided with a central bore having an irregularity, such as a notch, therein. A spindle 52 is provided with a complementary irregularity, such as a key. Carried by the hub 51 are the end plates 53, 54, and 55 which guide the films during their winding upon the hub 51. Thus, the film 42 will obviously be guided and wound up between the plates 53 and 54, while the film 20 will be wound up between the plates 54 and 55. The corresponding feeding reel may be similarly constructed.

It will be obvious, however, that a composite reel such as that illustrated in Figure 6 is not essential. A pair of reels may be provided, one for each of the picture and sound films, and if the key upon the spindle 52 is of suitable length, both reels may be mounted in axial alignment upon such spindle to fulfill a similar function.

The features of my invention will be obvious from the foregoing. Not only may the picture and sound films be independently printed and developed, but they may be independently handled for purposes of repair, reprinting, or the like. The picture film is capable of employing the maximum width for purposes of the pictures themselves, and such film may be used independently of the sound film with any standard type of projecting device whether the latter is provided with means for reproducing sound or not. In case of breakage, it is obvious that the corresponding markings on both films will enable rapid and proper repair and realignment.

One of the important features of my invention lies in the fact that it entails the employment of nothing but standard film. The films 20 and 22, though in completed form of less width than standard, are nevertheless constituent parts of an initial standard film which may be printed and developed with standard mechanism and according to well-established methods and procedures.

Furthermore, it is obvious that a single standard film 10 may be employed for producing two sound films, without any wastage. Accordingly, by the use of only three standard size films I am enabled to provide two sets of picture and sound films.

Another important advantage of my invention lies in the fact that the sound film is not subjected to the rough treatment which the intermittent mechanism entails. Being fed non-intermittently through the projecting apparatus, it is not subjected to any wear and tear that is not absolutely necessary.

At the same time, it is to be noted that complete rebuilding of projecting apparatus is entirely unnecessary. The fact that the sprocket 32 has three sets of teeth on it instead of only two does not mean that the entire apparatus must be rebuilt, because I have found by actual experimentation that sufficient space is available in standard projectors to permit simple withdrawal of the customary sprocket and the replacement thereof by the sprocket of Figure 5. The same is true with respect to the take-up sprocket 33. Furthermore, since a composite reel of the character of Figure 6 is not absolutely essential, standard reels may be employed for at least the picture portion of each set of films. Obviously, the feed and take-up magazines must be slightly enlarged in width, but this can be accomplished at very slight expense and without much difficulty. When such enlarged magazines are once installed, they need not be replaced even though ordinary picture films are to be projected.

It will be understood that the word "producing" as used herein is not to be interpreted in the specialized sense of the motion picture industry, according to which significance the original photography is referred to. The word "producing" as herein used and as it appears in the accompanying claims is to be given its customary significance, somewhat synonymous to "manufacturing" or "making". The description and illustrations herein contained are believed to set forth clearly the fact that the present invention has reference primarily to the processing of the negative films after the latter have been created by the producer himself.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, but not in a limiting sense.

Having thus described my invention and illustrated its use, what I claim as new and desire to secure by Letters Patent is—

1. The herein-described method of producing and projecting sound-motion-pictures, which consists in producing a pair of positive films of equal width on each of which a series of pictures are arranged occupying substantially the entire width of the film, producing along one longitudinal half of a third positive film of the same width a sound record corresponding to the pictures on one of said first-named films, producing along the opposite longitudinal half of said third film and in the opposite longitudinal direction a second sound record corresponding to the pictures on the other of said first-named films, splitting said third film longitudinally to separate said sound records, and simultaneously projecting each of the picture films and the corresponding half of said third film.

2. In a motion picture projecting machine, means for feeding into said machine a pair of films one of which has a pair of rows of perforations and the other of which has only one such row along one edge thereof, and means for simultaneously engaging both of said films to advance them side by side, said last-named means comprising a sprocket having a hub portion and three sets of sprocket teeth mounted thereon, said sets of teeth being spaced by unequal amounts along the axis of said hub portion, and said hub portion being provided with a shoulder adjacent to the intermediate set of sprocket teeth, said shoulder being adapted to support the unperforated edge of said second-named film.

3. In a motion picture projecting machine, means for feeding into said machine a pair of films one of which is of standard width and has a pair of rows of perforations, the other of which is a longitudinal half of a standard-width film and has one unperforated edge and a single row of perforations opposite thereto, and means for simultaneously engaging both of said films to advance them side by side with said unperforated edge adjacent to one edge of the standard-width film, said last-named means comprising a sprocket having a hub portion and three sets of sprocket teeth mounted thereon, two of said sets being so spaced as to engage said pair of rows of perforations, the other set being so positioned as to engage said single row of perforations, and said hub portion being provided with a shoulder adjacent to the intermediate set of sprocket teeth, said shoulder being adapted to support the unperforated edge of said second-named film.

4. In a motion picture projecting machine, means for feeding into said machine a pair of films one of which is of standard width and has a pair of rows of perforations, the other of which is a longitudinal half of a standard-width film and has one unperforated edge and a single row of perforations opposite thereto, and means for simultaneously engaging both of said films to advance them side by side with said unperforated edge adjacent to one edge of the standard-width film, said last-named means comprising a sprocket having a hub portion and three sets of sprocket teeth mounted thereon, two of said sets being so spaced as to engage said pair of rows of perforations, the other set being so positioned as to engage said single row of perforations, and a flange adjacent to the middle set of teeth for guiding said unperforated edge and the edge adjacent thereto.

ERNEST STERN.